US005677523A

United States Patent [19]

Coleman

[11] Patent Number: 5,677,523
[45] Date of Patent: Oct. 14, 1997

[54] METHOD FOR CALIBRATION OF AN OPTICAL OUTPUT POWER OF A LASER DIODE AT A MINIMUM AND A MAXIMUM SCANNING RANGE

[75] Inventor: Edward P. Coleman, Fairport, N.Y.

[73] Assignee: PSC Inc., Webster, N.Y.

[21] Appl. No.: 643,589

[22] Filed: May 6, 1996

Related U.S. Application Data

[63] Continuation of Ser. No. 332,015, Oct. 31, 1994, Pat. No. 5,612,529.

[51] Int. Cl.⁶ .................................................. G06K 7/10
[52] U.S. Cl. ........................ 235/455; 235/454; 235/462
[58] Field of Search ................................ 235/454, 455, 235/472, 462

[56] References Cited

U.S. PATENT DOCUMENTS

| | | | |
|---|---|---|---|
| 4,315,245 | 2/1982 | Nakahara et al. | 240/146.3 |
| 4,481,667 | 11/1984 | Price et al. | 382/65 |
| 4,528,444 | 7/1985 | Hara et al. | 235/462 |
| 4,677,287 | 6/1987 | Ejima | 250/205 |
| 4,816,661 | 3/1989 | Krichever et al. | 235/472 |
| 4,820,911 | 4/1989 | Arackellian et al. | 235/467 |
| 4,831,275 | 5/1989 | Drucker | 235/462 X |
| 4,894,817 | 1/1990 | Tanaka et al. | 369/54 |
| 4,933,538 | 6/1990 | Heiman et al. | 235/462 |
| 5,148,008 | 9/1992 | Takenaka | 235/455 |
| 5,149,948 | 9/1992 | Chisholm | 235/462 |
| 5,179,269 | 1/1993 | Horie et al. | 235/455 |
| 5,200,597 | 4/1993 | Eastman et al. | 235/455 |
| 5,210,398 | 5/1993 | Metlitsky | 235/462 |
| 5,260,554 | 11/1993 | Grodevant | 235/462 |
| 5,267,253 | 11/1993 | Nakatani | 372/38 |
| 5,268,914 | 12/1993 | Yamamuro et al. | 372/31 |
| 5,280,162 | 1/1994 | Marwin | 235/462 |
| 5,308,962 | 5/1994 | Heavens et al. | 235/435 |
| 5,363,387 | 11/1994 | Sinofsky | 372/15 |
| 5,373,581 | 12/1994 | Uchiyama et al. | 372/38 |
| 5,382,782 | 1/1995 | Hasegawa et al. | 235/455 |
| 5,406,062 | 4/1995 | Hasegawa et al. | 235/462 |
| 5,426,288 | 6/1995 | Obata et al. | 235/462 |
| 5,438,187 | 8/1995 | Reddersen et al. | 235/462 |
| 5,504,315 | 4/1996 | Hardesty et al. | 235/462 |

FOREIGN PATENT DOCUMENTS

| | | |
|---|---|---|
| 0 378 199 | 7/1990 | European Pat. Off. . |
| 0033426 | 3/1997 | Japan . |

*Primary Examiner*—Donald T. Hajec
*Assistant Examiner*—Karl Frech
*Attorney, Agent, or Firm*—Foley & Lardner

[57] ABSTRACT

A system for bar code reading and scanning is provided having automatic gain control for accurate reading of bar codes over a range of distance. An amplifier within the system provides a plurality of selectable amplification gain levels for increasing the size of the signal received by a digitizing element. A processor is programmed to select the gain level. The system has a light source, preferably a laser diode, and a laser diode circuit, which provides accurate setting by the processor of the laser optical power output. The laser diode is calibrated according to each selected gain level of the amplifier such that the system can scan within a desired range of distances from the system to a bar code. The system successively scans a bar code, with each scan being at a different amplification level. In the alternative, a signal size detector provides a signal representative of the size of the signal to the digitizer. Utilizing this detector, the system successively scans a bar code and switches the amplification level responsive to signal size.

13 Claims, 8 Drawing Sheets

METHOD FOR CALIBRATION OF AN OPTICAL OUTPUT POWER OF A LASER DIODE AT A MINIMUM AND A MAXIMUM SCANNING RANGE

This application is a continuation of application Ser. No. 08/332,015, filed Oct. 31, 1994, now U.S. Pat. No. 5,612,529.

FIELD OF THE INVENTION

The present invention relates to systems (methods and apparatus) for reading and scanning symbols, and more particularly to a bar code scanner and reader having automatic gain control. This application is related to a U.S. patent application Ser. No. 08/296,788 filed Aug. 26, 1994 by the inventor hereof.

BACKGROUND OF THE INVENTION

Bar code scanners generally operate by scanning a light beam across a symbol and translating the light reflected from the symbol into signals representing a bar code. The components of a bar code scanner include a light source to produce a light beam, an arrangement of mirrors and optics for light transmission and collection, a photo-detector to change returned light into electronic signals, and signal processing electronics to translate the signals produced by the photo-detector into time-variant signals for bar code decoding.

The strength or size of the photo-detector signals depends on the intensity of the returned light from the symbol. The returned light intensity varies with the distance of the symbol to the scanner, and the optical output power of the light source. The fluctuations in light intensity result in variations in the strength or size of the photo-detector signal, producing problems in signal processing. Specifically, the signal processing electronics contain a digitizer circuit for producing an analog bar code signal for bar code decoding. If the signal to the digitizer is too high, the digitizer becomes overloaded and cannot operate, while if the signal to the digitizer is too low, the digitizer cannot convert the signal with high accuracy.

This problem is typically addressed by providing amplification to increase the signal size prior to the digitizer. In the prior art, amplification has been provided by analog amplifier circuits which vary the amplification gain level using a feedback loop from a peak detector circuit. Also the prior art has incorporated digital potentiometers within the feedback amplifier circuit to digitally set the level of amplification gain. See U.S. Pat. No. 5,200,597 issued Apr. 6, 1993 to J. Eastman, et al. This results in a system which constantly searches for a particular amplification gain level during each scan of a symbol over many possible levels.

In addition to variations in intensity, the photo-detector signals also vary due to the symbol being scanned, more particularly, to the contrast of the symbol from the symbol's background. It is desireable to provide amplification in a scanner which accounts for such variations in contrast, while controlling the amplification gain to increase signal size prior to the digitizer.

The present invention, instead of using many possible amplification gain levels, provides a means of amplification which requires only a few levels of amplification, preferably two. The system is calibrated according to each level of amplification to perform scanning within a desired distance range of operation. The system uses a laser diode as the light source within a laser diode circuit. This circuit may be accurately set by a processor to a particular laser optical output power level. The system calibrates the laser diode power output for each selected amplification gain level over the desired scanner operating range of distances. The laser power output level is set to the calibrated level for future scanning. During operation, the processor selects the amplifier gain level on each successive scan according to its programming. Each scan may be at a different gain level, or at a gain level determined responsive to the size of the input signal to the digitizer.

SUMMARY OF THE INVENTION

It is an object of the present invention to provide an improved system for bar code reading and scanning having an amplifier with a plurality of selectable amplification gain levels.

It is another object of the invention to provide an improved programmable processor to select the gain level of the amplifier.

Another object of the invention is to provide an improved system light source that can be accurately set to an optical output power level.

A further object of the invention is to calibrate the light source according to each selected gain levels over a operating range of scanning.

It is an additional object of the invention to successively scan a bar code, where each scan is at a different gain level, or in the alternative, where the processor selects the gain level for each scan responsive to an input signal to the digitizer.

Briefly described, an optical symbol reading and scanning system for providing signals representing the symbol having a light beam which scans a symbol and a photo-detector which receives the returned light from the symbol includes circuity for providing a first signal representing the returned light received by a photo-detector, an amplifier having a plurality of selectable gain levels to provide a second signal corresponding to the size of the first signal increased by the selected amplifier gain level, a first processor for selecting the amplifier gain level for successive scans on the symbol, and circuitry for translating the second signal into signals representing the symbol.

The system further includes a light source for producing the light beam, a light source control circuit for setting the optical power level of the light source at a certain optical power, a second processor for determining the optimum optical power level of the light source with respect to each amplification level, a memory unit for storing the optical power level, and a third processor to set the light source to the optical power level stored in the memory unit prior to scanning the symbol. A programmed digital computer provides the first, second, and third processors.

BRIEF DESCRIPTION OF THE DRAWINGS

The foregoing and other objects, features and advantages of the invention as well as a presently preferred embodiment thereof will become more apparent from a reading of the following description in connection with the accompanying drawings in which.

3

DETAILED DESCRIPTION OF THE INVENTION

Figure 1:
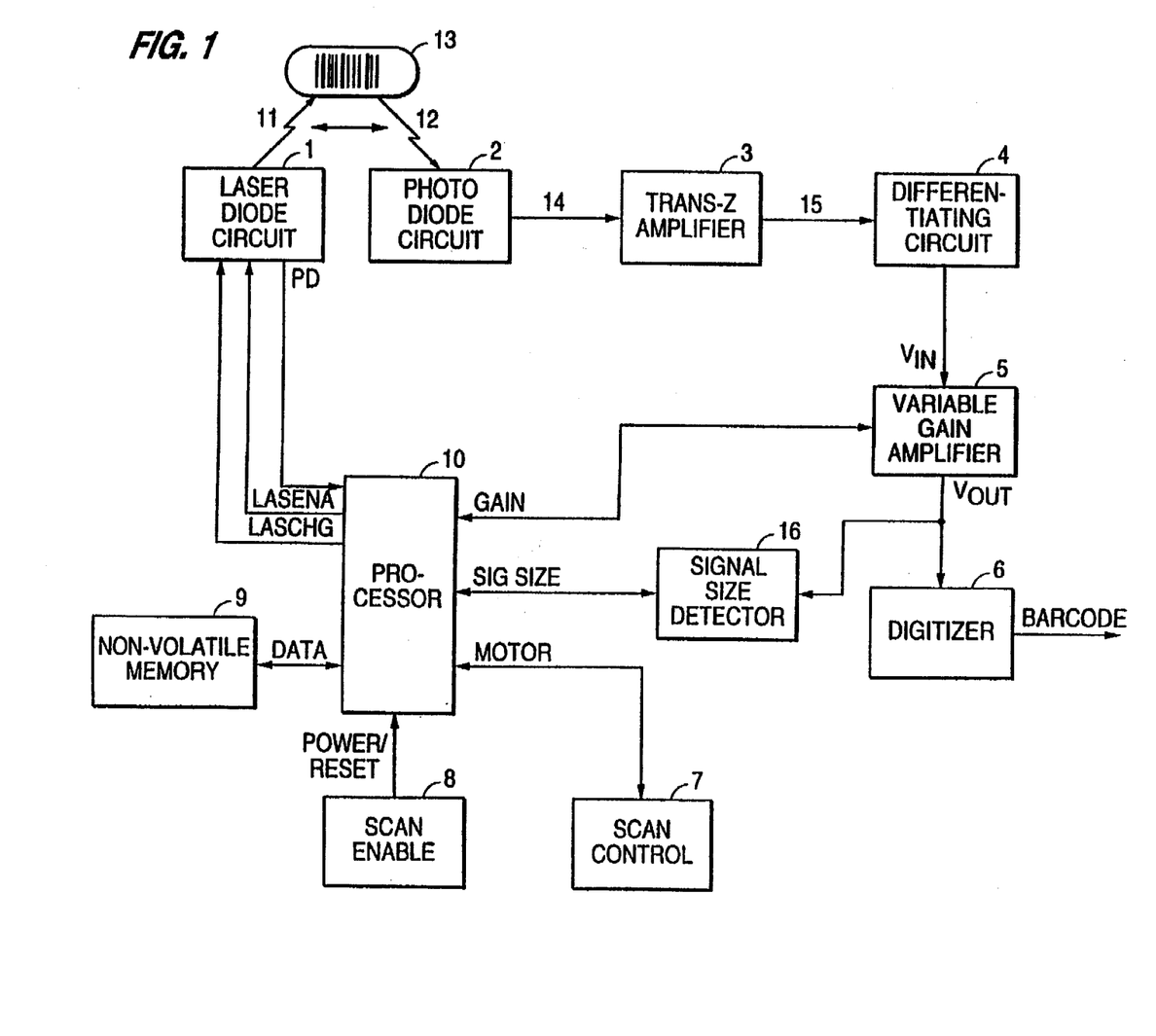
FIG. 1 is a block diagram of the system.

Referring to FIG. 1, there is shown a block diagram of the system. The light source, preferably a laser diode, is contained in laser diode circuit 1. The laser diode scans a light beam 11 at symbol 13. Returned light 12 from the symbol 13 is received by photo diode circuit 2. The light beam 11 and returned light 12 are represented as jagged arrows to and from the symbol 13. Mirrors and optics in the scanner, not shown in FIG. 1, are provided to transmit the light beam 11 and to collect returned light 12. A processor 10 controls the scanning via the MOTOR line to scan control 7. Scan control 7 encompasses control of motors within the scanner to change the angular position of light beam 11 relative to the symbol 13.

Photo diode circuit 2 contains a photo detector, preferably a photo-diode, to convert the returned light 12 into current signal 14 for transimpedance amplifier 3 (TRANS-Z), which produces voltage signal 15 corresponding to current signal 14. Voltage signal 15 is differentiated by differentiating circuit 4 to produce VIN, which is a signal that follows the transition in voltage signal 15. These transitions correspond to locations of the edges of the bars and spaces of the symbol. VIN is sent from differentiating circuit 4 to variable gain amplifier 5.

The amplifier 5 provides for a plurality of amplification gain levels, preferably two. Amplifier 5 increases the amplitude of the AC component of VIN by a gain level selected by processor 10 via GAIN line connecting processor 10 to amplifier 5. Amplifier 5 produces VOUT, which corresponds to VIM amplified by the selected gain level, to digitizer 6 which outputs BARCODE, a voltage signal representing analog pulses, to a decoder (not shown) for determining the presence of a bar code. Alternatively, BARCODE may be sent to a processor input port and decoding provided within the processor.

In the first embodiment of the invention, signal size detector 16 and SIGSIZE line are not present. The signal size detector 16 and SIGSIZE line are features of the second embodiment of the invention, and will be discussed later.

FIG. 1 also shows non-volatile memory 9 which is connected to processor 10 via the DATA line. Memory 9 provides storage of values for system operation. The processor 10 can read memory 9 or write to memory 9 (additional read/write lines not shown). Preferably, the non-volatile memory a is an EPROM.

The scanning of the system is enabled and disabled by processor 10 via POWER/RESET line from scan enable 8. Scan enable 8 provides for controlling the activation of the system, for example by a trigger or a bar code decoder. In operation, a low level on POWER/RESET line indicates to the processor 10 to start scanning, whereas a high level indicates to the processor 10 to cease scanning.

Processor 10 may be a single microprocessor or several processors which operate in conjunction. The processor 10 preferably-contains a built-in analog to digital converter with input ports to the converter, however in the alternative, the processor 10 may utilize a separate component providing analog to digital conversion. Preferably, processor 10 is a Motorola 68HC705P6.

FIG. 1 only shows the control and input lines necessary for a complete description of the invention, and those knowledgeable in the art can appreciate that additional control lines may be provided for other features, such a diagnostic lines, programming lines, and the like.

Figure 2:
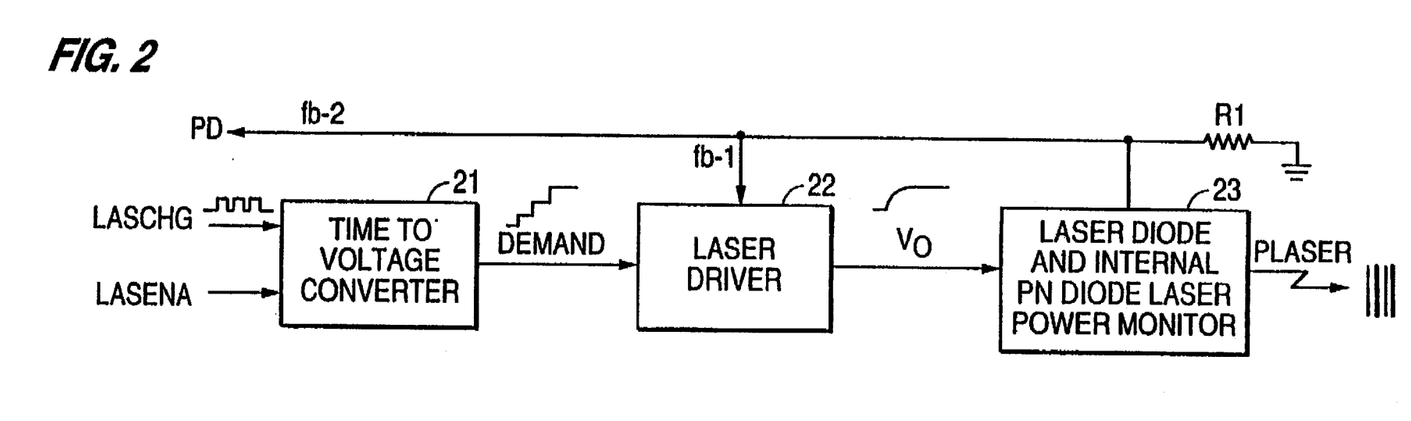
FIG. 2 is a block diagram of the laser diode circuit shown in FIG. 1.

Now turning to FIGS. 2 and 3, the laser diode circuit 1 of FIG. 1 is shown in greater detail. Referring first to FIG. 2, there is shown processor 10 input line PD, which connected to an analog to the digital converter (ADC) of processor 10, and output lines LASENA and LASCHG. The digital control of laser power in a bar code scanner is shown in the above referenced Eastman, et al. patent, U.S. patent application Ser. No. 08/296,788, filed Aug. 26, 1994 by the inventor hereof and referenced above, and in U.S. Pat. No. 5,260,554, issued Nov. 9, 1993, to S. R. Grodevant. Processor output LASCHG provides a series or sequence of pulses. Three LASCHG pulses are shown above the LASCHG line. One of these pulses, namely the last, determines the output optical power (Plaser) from a laser diode 23 which has an internal photodetector optically coupled to the laser diode for monitoring the laser power and providing a current through a monitor resistor R1. The voltage across resistor R1 is the internal photodetector monitor voltage (PD). This voltage is feedback on voltage line fb-2 to the PD input of processor 10.

The controller also generates a reset pulse, LASENA. This pulse is timed to occur at the end of a scan, which is used in the laser scanner to detect the presence of an object or bar code label and initiate scanning. Reference may be had to the Eastman, et al. and Grodevant patents referenced above for the design of the software and hardware which provides the continuous scanning mode and also signals which are generated at the start of each scan (SOS).

Figure 3:
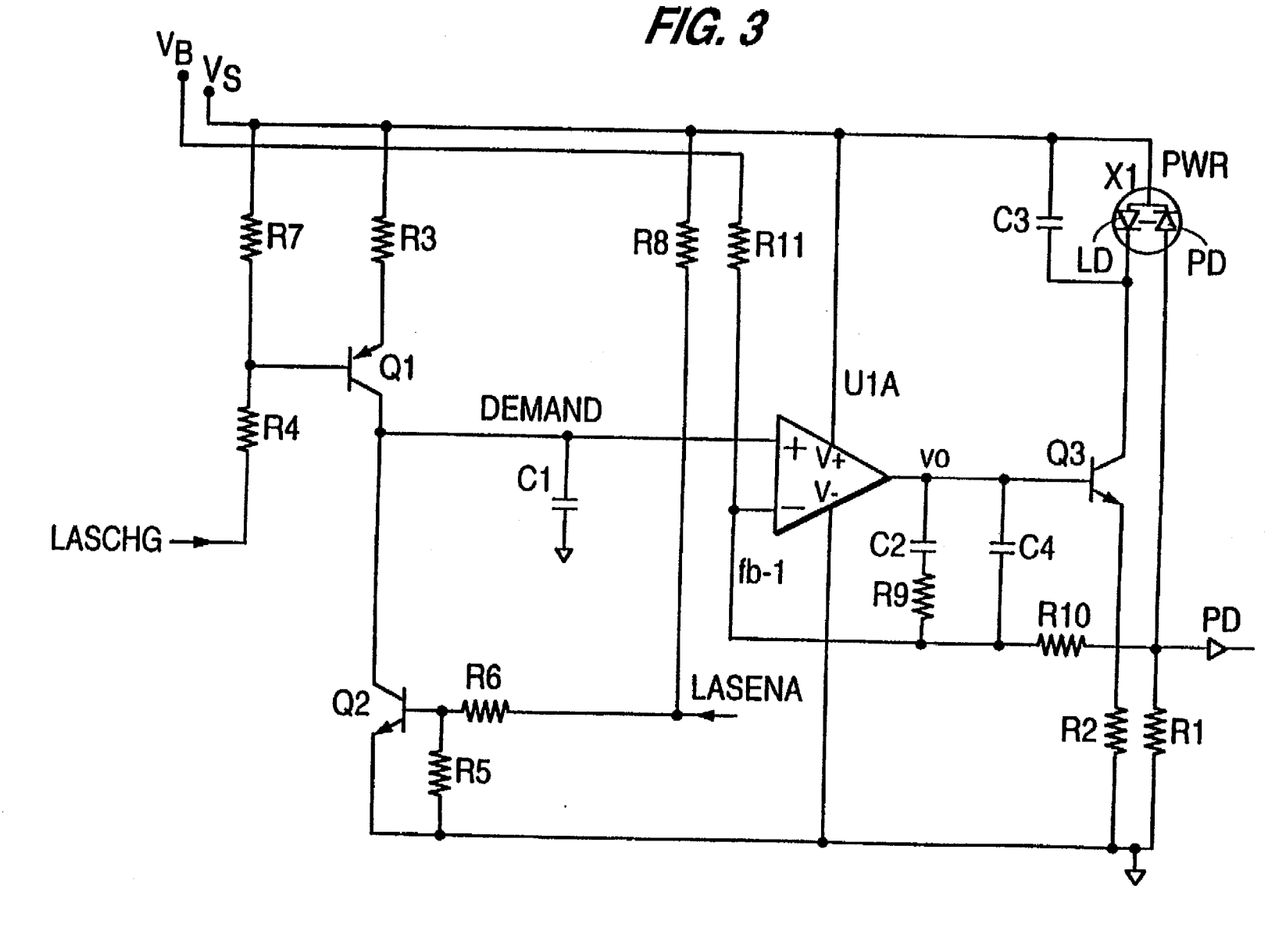
FIG. 3 is a schematic diagram of the laser diode circuit shown in FIGS. 1 and 2.

The LASCHG pulses charge a capacitor (C1-FIG. 3). The duration of these pulses is converted to a corresponding voltage in a time to voltage converter 21 for the three LASCHG pulses shown above the LASCHG line. A quasi staircase waveform to a desired demand voltage DEMAND shown above the DEMAND line is obtained. The DEMAND voltage is applied to a laser driver stage 22 which produces a drive voltage (Vo) for the controlling the current through the laser diode 23. The laser driver 22 is also in a feedback relationship with the laser diode 23 and receives PD through an isolating resistor (not shown in FIG. 2) on feedback voltage line fb-1.

During calibration or prior to starting each scan, it may be desired that the DEMAND voltage attains the value corresponding to the desired laser power (Plaser) to optionally cut off the output beam from the laser. To this end, a shutter (not shown) controlled by processor 10 may be used. Alternatively, the mirror of the scanner or the laser mount may be moved so as to tilt the beam away from a window through which the beam projects. The term shutter includes the hardware or software in the controller necessary to control the tilting of the mirror or laser mount or the introduction of a physical shutter.

Referring to FIG. 3, the circuit shown includes the laser diode 23, the mime to voltage converter 21, and the laser driver 22. The operating voltage is supplied from a supply voltage source, indicated as $V_s$, which may be of a level usual for TTL logic circuit, namely, 5 volts to ground. A bias voltage $V_B$ is utilized as an offset voltage (here 1.2 volts) in order to assure laser cutoff when the time to voltage converter 21 is reset. R1 is also shown in FIG. 3. The demand voltage DEMAND is generated by charging a capacitor C1 via a current source provided by Q1, R3, R4 and R7. C1, therefore, charges at a linear rate for the duration of each pulse of the LASCHG pulses.

The capacitor need not be a special high tolerance capacitor, but may be a low cost capacitor; the capacitance value of which is rated to a tolerance of 20–30%. There are also tolerances in each of the resistors and in the transistors such that the DEMAND voltage as a function of the duration of the LASCHG pulses may vary. However, the relationship is monotonic, and particularly is linear. The system is operative to adjust one of the LASCHG pulses, and particularly the last in a succession of the three consecutive pulses so as to translate LASCHG into DEMAND of the amplitude corresponding to the desired laser output power.

During scanning, the laser power output is in continuous operation, i.e., DEMAND is maintained during the scan. A reset circuit responsive to the LASENA pulse from the microprocessor of the processor 10 includes Q2, R5 and R6. Q2 provides a discharge path for C1 when the LASENA pulse is applied thereto. The leakage of current from C1 until the LASENA pulse is applied is limited because the principal leakage paths are through the emitter and collector junctions of Q1 and Q2 which presents a very high resistance when cut-off. Also, the input to the laser driver 22 is at the direct input of an operational amplifier U1A which is also a very high resistance. Thus, the DEMAND voltage may be maintained for sufficient time to complete a scan. The scan time may vary from 20 to 70 milliseconds (ms).

U1A has a direct input (+), also called a non-inverting input, and inverting input (−). The operating voltage is applied between so-called rail inputs v+ and v−. The output of U1A is V0. This output is applied to a voltage to current converter (a transconductance element including Q3 and R2). The collector to emitter path of Q3 and R2 are in series with the laser diode (LD) of the laser diode photodetector unit X1.

Laser power (Plaser) is an exponential function of laser current. The output of the photodetector (PD) is a linear function of the laser power and is fed back to the inverting input on line fb-1 via an isolating resistor R10 having a resistance much higher than R1. Accordingly, the relationship between DEMAND and also V0 and the laser drive current is logarithmic, due to the laser diode's exponential response in the feedback loop. But the relationship between PD and also DEMAND and laser optical power is linear, because the photo-diode PD current v.s. optical power characteristic is linear over the operating range. A compensating network to prevent oscillation is also connected in a feedback relationship between the output and the inverting input of U1A. This compensation network consists of C2, C4, R9 and R10. A capacitor C3 is connected across LD to suppress noise in the supply voltage $V_S$ from affecting the current through LD.

The laser diode circuit 1 is calibrated by determining, on the PD line to processor 10, the count corresponding to the desired optical output power of LD, and the time counts (duration of LASCHG pulses) needed to produce the desired optical output power of LD. For example, output power may be 4 mW which corresponds to a monitor voltage of 400 mV.

The processor may send short pulses each corresponding to a time count. These pulses may be 3 microseconds in duration. While the pulses are generated, the number of counts is stored corresponding to the PD amplitude for the desired power level. The calibration may require a hundred or more 3 microsecond pulses to reach the desired PD amplitude. The PD output corresponds to the desired power Pc from the laser. The number of counts obtained by processor on PD and the number of counts corresponding to the LASCHG pulse are stored in memory 9 by processor 10 during a configuration when the scanner is being manufactured.

Figure 4:
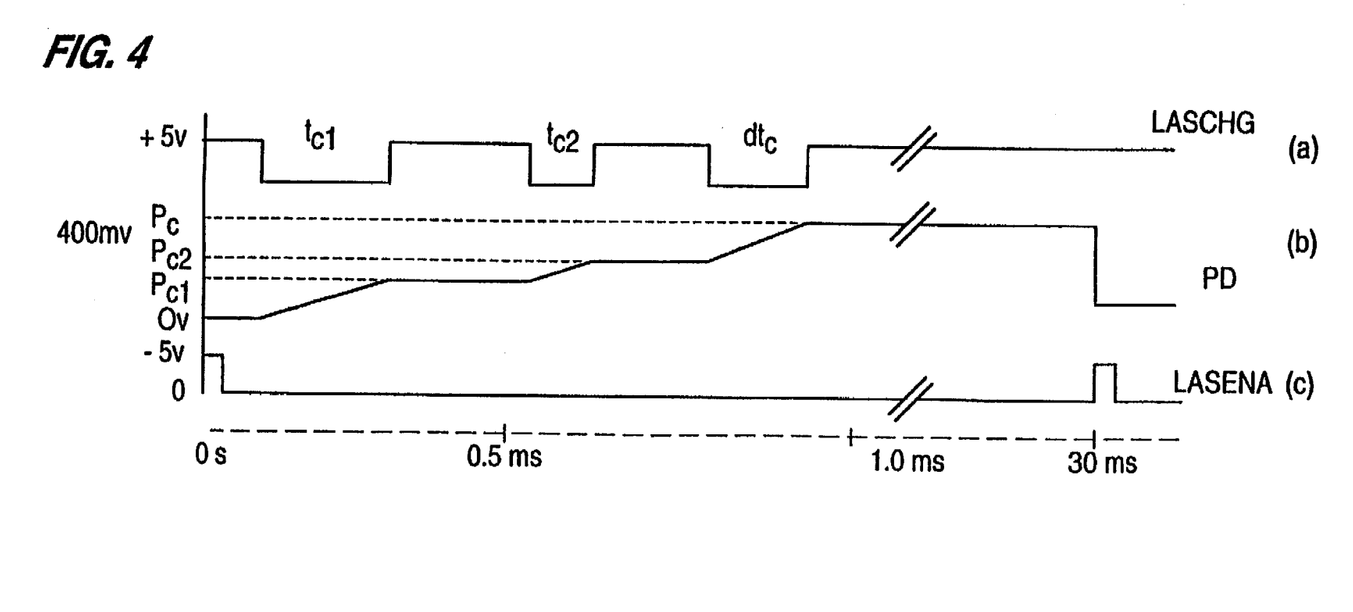
FIG. 4 is a timing diagram of signals and pulses appearing in the circuit shown in FIGS. 2 and 3 in continuous optical output power mode operation.
Figure 4A:
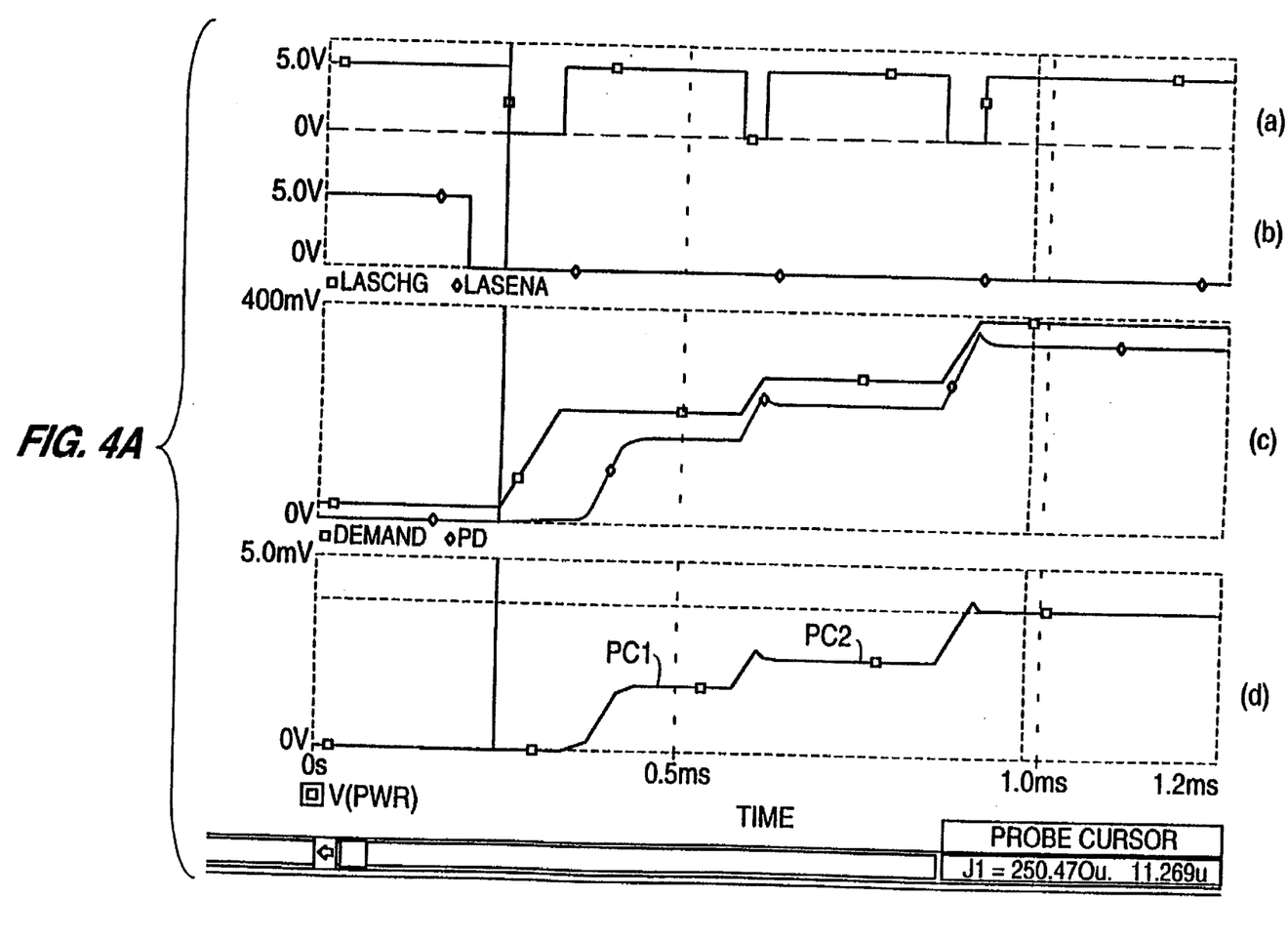
FIG. 4A is a more detailed timing diagram illustrating the operation of the circuit shown in FIGS. 2 and 3 in continuous output mode.

Refer to FIGS. 4 and 4A, a first pulse of duration $tc_1$ suitably half the number of counts (half the duration) of the pulse time measured during calibration is used as $tc_1$. Prior to $tc_1$, the capacitor is discharged by application of the LASENA pulse (see line C in FIG. 4 and B in FIG. 4A). The capacitor $C_1$ charges during $tc_1$ and achieves a level corresponding to $Pc_1$ after a period for stabilization, say 100 microseconds. $Pc_1$ is stored in RAM (Random Access Memory) in the processor 10 in PD counts. The next pulse duration $tc_2$ is generated. $tc_2$ is a fraction, say 30% of $tc_1$. Thus, if $tc_1$ is approximately 100 microseconds, $tc_2$ may suitably be 30 microseconds in duration. After $tc_2$ and before the final pulse there is indicated a time period as having a duration of vtc. Accordingly, after a stabilization period, the PD voltage (corresponding to $Pc_2$) is again measured in the processor 10. There are now two points of measurement and counts which are stored in processor built-in memory corresponding to the durations of $tc_1$, $tc_2$, $Pc_1$ and $Pc_2$. From these counts, by using a linear regression or least squares computation, the number of counts or duration for dtc in order to obtain 400 mV for PD corresponding to 4 milliwatts of power can be computed in processor 10. This computation makes the laser diode circuit 1 forgiving for variations in tolerances in the capacitor and other components of the system. The laser diode circuit 1, therefore, is capable of accurately selecting the desired laser power while preventing the voltage to which the capacitor is charged from causing the laser to be driven at more than a safe operating current, thereby preventing destruction of the laser.

Processor 10 is programmed to compute the following equation:

$$dtc = dP_c \frac{tC_2}{Pc_2 - Pc_1}$$

where:

dtc is the additional charge time in counts (minimum resolvable time elements, 3 µs in this example).

Pc is the desired power setting in counts.

dPc is the desired change in power in counts (Pc-$Pc_2$).

$tc_1$ is the charge time for the first charge pulse in counts.

$tc_2$ is the charge time for the second charge pulse in counts.

$Pc_1$ is the first sample laser power in counts (PD).

$Pc_2$ is the second sample laser power in counts (PD).

In FIG. 4A, line (d) shows the optical power output of the laser diode circuit 1. Also shown are the points in time when the sample laser power is measured.

In the alternative, the laser diode circuit 1 may be operated in a pulse mode rather than in the continuous operation mode described above, with the use of additional circuit elements to the system. This would provide a laser operating at a fraction of laser power used during continuous operation mode. To achieve this, DEMAND is maintained only during the duration of the laser pulses which are generated during the pulse mode of operation.

The laser diode circuit 1, processor 10, and memory 9 provide for accurate setting of the optical power output of the laser diode necessary for calibration of laser power and scanning.

Figure 5:
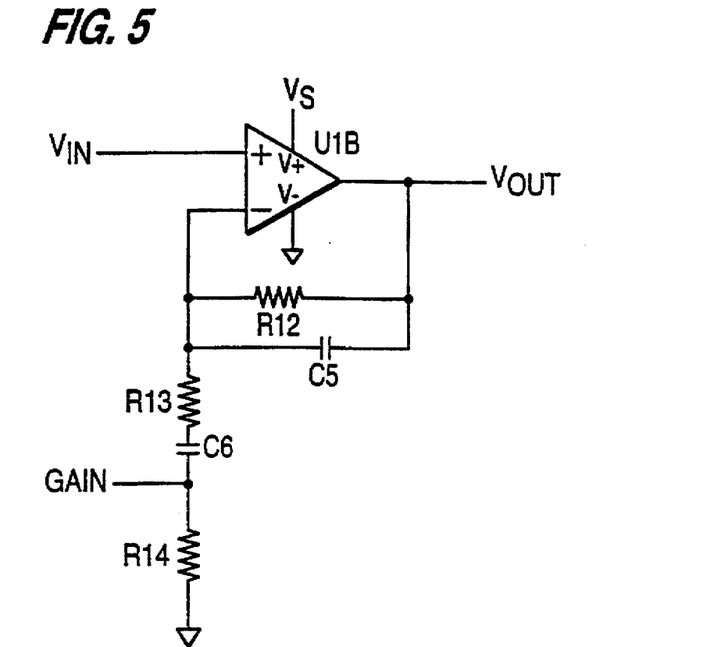
FIG. 5 is a schematic diagram of the variable gain amplifier circuit shown in FIG. 1.

FIG. 5 shows a schematic of the circuit for variable gain amplifier 5 of FIG. 1. There is shown an operation amplifier U1B with a direct or non-inverting input (+), and inverting input (−). The operating voltage of U1B is applied between V+ and V−, where V+ is connected to Vs, and V− is connected to ground. VIN is provided to the non-inverting input of U1B from differentiation circuit 4 of FIG. 1. The output of U1B, Vout, is applied to the inverting input through resistor R12 and capacitor C15 in parallel connection. Also connected to the inverting input of U1B are resistors R13 and R14 in series, with capacitor C6 between them.

Processor 10 control of the GAIN line provides for switching of amplification gain level of amplifier 5. The GAIN line is connected from a tristate port of processor 10 of FIG. 1 to amplifier 5 between capacitor C6 and resistor R14. This tristate port is used in two states, zero impedance and high impedance. When the GAIN port is set to high impedance, the GAIN line to amplifier 5 is set to a very high resistance with little leakage current (less than 1 microamp). To amplifier 5 the GAIN line is effectively an open circuit, thus the operation of amplifier 5 can be expressed by the following equation:

$$\text{Vout} = \text{Vin}\left(\frac{R12}{R13+R14} + 1\right) \quad \text{Eq. 2}$$

When the GAIN port is set to low impedance, the GAIN line to amplifier 5 is effectively grounded, thus R14 appears grounded. The amplifier 5 operation is now expressed by the equation:

$$\text{Vout} = \text{Vin}\left(\frac{R12}{R13} + 1\right) \quad \text{Eq. 3}$$

Consequently, as shown by equations 2 and 3, switching the GAIN port state of processor 10 provides a low level of amplification gain when the GAIN port is set to high impedance, and a high level of amplification gain when the GAIN port is set to low impedance. The amount of gain in the low and high states is determined by the choice of resistors R12, R13, and R14. Table I shows suggested values for these resistors, where the ratio of gain from high to low is approximately 4.61:1.

Due to the high frequency bandwidth of the VIN signal, capacitor C5 appears to be effectively, and capacitor C6 is effectively open shorted. The presence of C5 is to avoid the propagation of DC offsets which may be caused by amplifier 5. This to assure that only the AC component of the VIN signal is amplified by amplifier 5 according to equations 2 and 3.

Additional gain levels can be provided in amplifier 5 beyond the two gain levels so far described. For example, other gain lines may be provided from additional tristate ports of processor 10 to a connection between C6 and R14 of amplifier 5. Each of these additional gain lines contain a resistor. The particular ratio between each level being determined by the selection of resistors on each gain lines, and R12, R13, and R14. Processor 10 selects a particular gain level by controlling the state of the tristate ports. In the alternative, the amplifier circuit may be cascaded in stages to provide additional gain levels, where each stage has a gain line to a tristate port on processor 10.

During manufacture of the system, there is a calibration of the optical output power of the laser diode in laser diode circuit 1. This calibration provides that the laser operates at a power level that produces a system response for accurate scanning and reading of symbols within a range of distances between the system and symbol or types of symbols, where contrast may vary between symbol and symbol background. This optical output power is called the nominal output power, and represents the optimum output power of the laser for the system.

Figure 6:
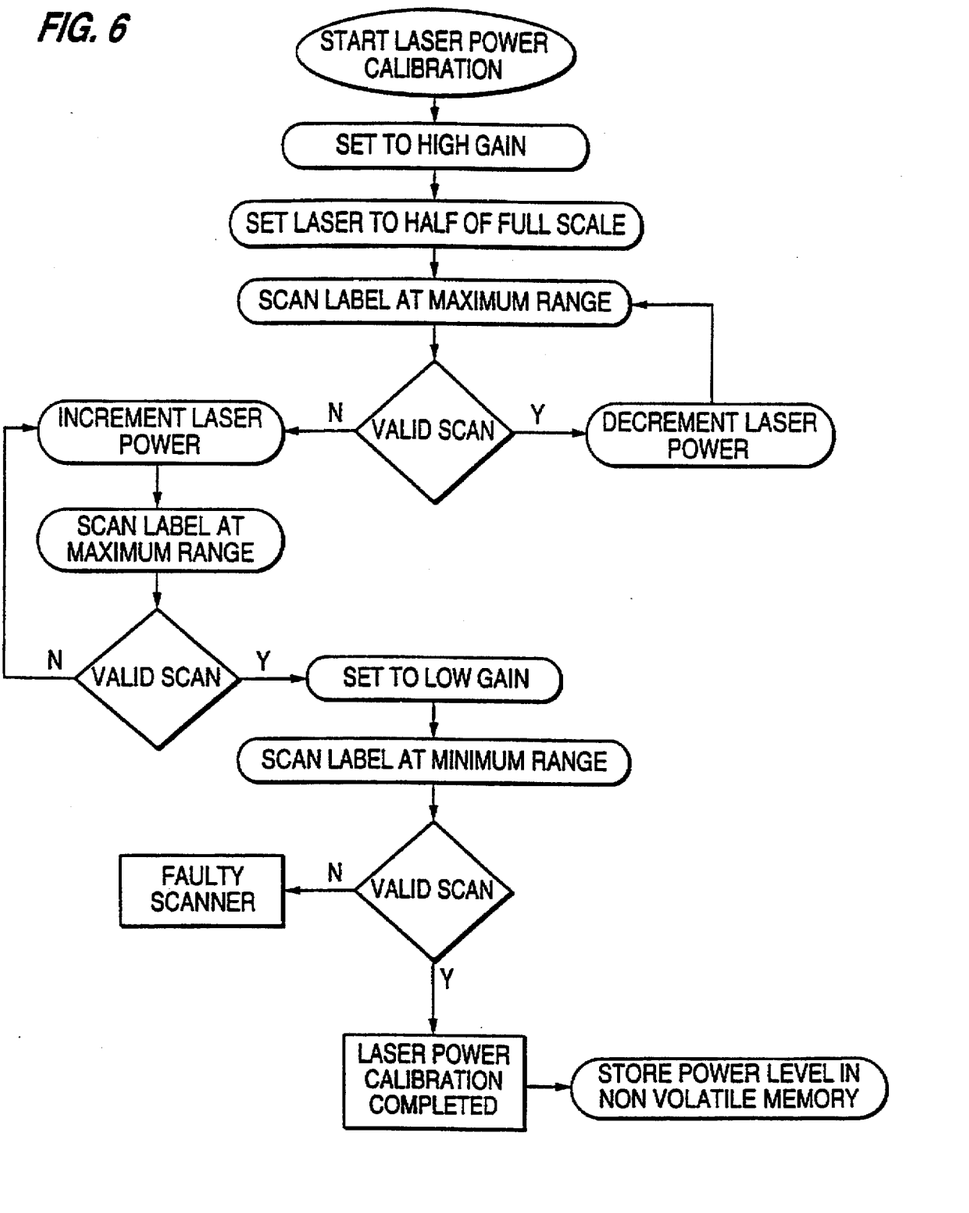
FIG. 6 is a flow chart illustrating the program utilized in calibration of the nominal laser power level.

FIG. 6 shows a flowchart which illustrates the routine for calibrating the laser's nominal output power. These steps are carried out according to programming in processor 10 and instructions received by processor 10 through a programmable external test fixture. Processor 10 is programmed such that via a connection between processor 10 and the test fixture, processor 10 responds to test codes received from the test fixture. For each test code received processor 10 may increment or decrement the laser power level. The amount of each decrement of increment depends on processor programming. The test fixture is programmed to control the system through processor 10 in order to direct scanning and operation of the laser diode in the laser diode circuit. Alternatively, processor 10 may be programmed to operate the calibration routine with the test fixture being directed by the processor 10 to provide test labels at specific distances from the system. Such test labels are described below.

Once the nominal laser power calibration routine of FIG. 6 is started, amplifier 5 is set by processor 10 to the high or maximum gain. The laser diode is then set to half of its full scale or maximum optical power output. The maximum optical power output of each laser diode is referenced according to the particular laser's optical power maximum rating.

A test label is provided having a surface with a symbol with selected characteristics of a bar code in terms of the relationship of the bars to spaces, and the contrast of the symbol to its background. Processor 10 scans the test label via scan control 7 at the maximum range, that is the farthest distance between scanner and symbol that the scanner should validly read a symbol. If the scan is valid, i.e., the system reads the symbol, the laser power decrements one level and the test label is scanned again. Laser power levels continued to be decremented until the system validly scans the test label.

At this point, the laser power is incremented one level and the test label is scanned again. If a valid scan of the test label does not occur, the laser power is continued to be incremented until the symbol is validly scanned. Once the symbol validly scans, amplifier 5 is switched to the low gain level by processor 10, and the test label is scanned at a desired minimum range, that is the shortest distance between scanner and symbol that the scanner should validly read a symbol. If the symbol is validly scanned at a minimum range, then laser power adjustment is complete and the power level the system last scanned at is stored in memory 9 by processor 10 as the nominal laser power level for the system. The nominal laser power level will be the laser power used in all future scanning by the system. However, if the symbol does not read at low gain at minimum range, a faulty scanner is indicated.

Additionally a verification step (not shown) can occur before calibration is completed for checking the system's response to a variety of labels within the maximum and minimum ranges. This step would be to verify that the system operates properly at the selected nominal optical power level.

Figure 7:
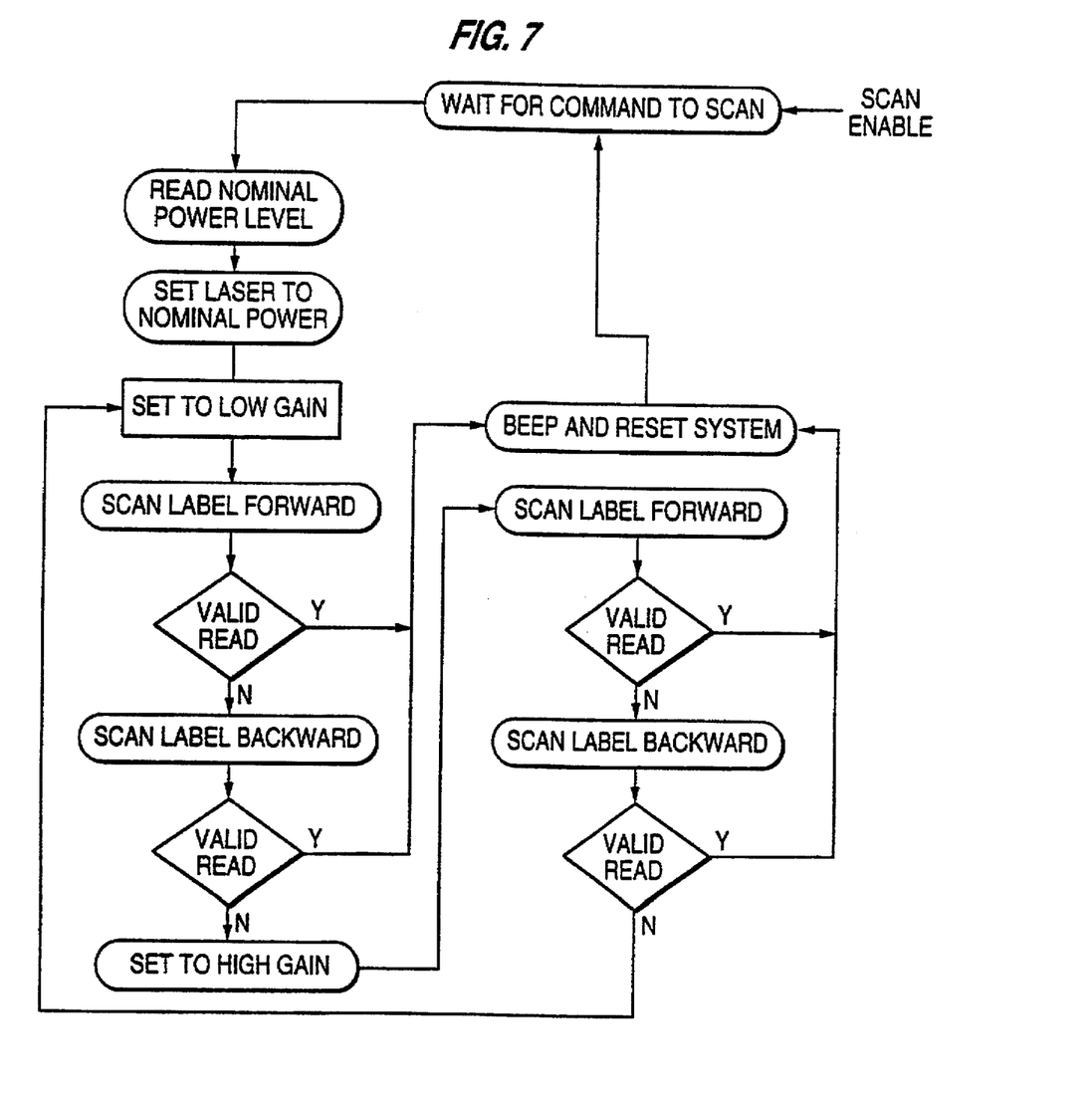
FIG. 7 is a flow chart of the scanning program in the first embodiment of the invention.

FIG. 7 shows the scanning routine for the system. Scanning is controlled by programming in processor 10. Before starting a scan, the processor 10 waits for a command to scan from scan enable 8. When a scan is enabled, the processor 10 reads the nominal power level stored in memory 9 and sets the laser diode through the laser diode circuit 1 to that stored optical power level. Amplifier 5 is initially set to low gain, and the label containing the symbol to be read is scanned forward and backward. During this scan, if a valid read of a symbol occurs, the system beeps to indicate that a valid read has occurred, resets to end scanning, and waits for the next command to scan from scan enable 8. If a valid read does not occur after the scan, the processor sets the amplifier gain to high, and the label is scanned forwards and backwards. If a valid read occurs during scanning, the system beeps to indicate that a valid read has occurred, resets to end scanning, and waits for the next command to scan from scan enable 8. If no valid read occurs, processor 10 sets amplifier 5 to low gain, and then scans again. Scanning alternates between high and low gain levels until a valid read occurs or scan enable 8 terminates.

In operation, there is variation in the intensity of the light received by the photo-diode in photo-diode circuit 2, resulting in variations of the amplitude or size of the signal to the digitizer 6. The primary reason for this intensity variation are changes in the distance between the system and the symbol being read. The relationship between signal amplitude, A, and this distance, R, is $A=1/R^2$. Thus, as distance increases, signal size exponentially decreases as $1/R^2$. Therefore, at larger distances, more amplification of the signal is required than at shorter distances.

The use of a plurality of gain levels provides the capability of scanning and reading bar codes within a fixed range, where low level gain covers a range from a minimum distance to a point in the mid-range, and high level gain covers a range from a maximum distance to a point in the mid-range. The ratio of gain levels are selected by resistors in the amplifier such that the range at each gain level overlap in the mid-range to avoid a possible gap where a valid scan could not take place.

The operating range for scanning of a system is determined at the time the nominal laser power is calibrated. The maximum and minimum distance of the test label used during calibration define a range at which the system will scan within. This range corresponds to nominal laser power level determined by the calibration routine. Circuit and component tolerances are therefore accommodated. Thus, the calibration routine provides a means of setting each laser diode in multiple systems to a specific optical power that assures that each system has scanning capability within the same desired range.

In the second embodiment of the invention, the system has signal size detector 16 shown in FIG. 1. The input line to signal size detector 16 is connected to Vout, the output of the variable gain amplifier 5. The signal size detector 16 provides SIGSIZE, a signal representing the size of Vout on a line to an analog to digital converter port on processor 10.

Figure 8:
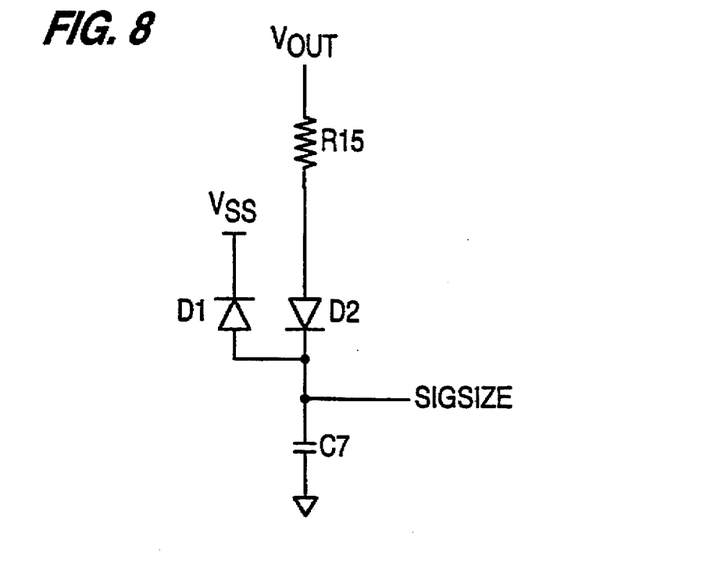
FIG. 8 is a schematic diagram of the signal size detector circuit.

FIG. 8 shows a schematic of the signal size detector circuit 16. This circuit operates as follows. Before signal size is measured, the detector is reset by capacitor C7 being discharged by processor 10. This is achieved by the processor 10 temporarily grounding the SIGSIZE input port until all charge on C7 is dissipated. Then, the SIGSIZE time is set as an input port to the processor 10. Now, the SIGSIZE port is ready to measure signal size of Vout. During scanning, diodes D1 and D2 are arranged so that C7 retains the highest AC amplitude of the Vout voltage minus a diode drop which is partially reduced by small resistor R15. D1 resets C7 at powerdown to prevent C7 from back powering the processor 10 through its electrostatic discharge circuitry which is connected to the signal size input port. This voltage on C7 is measured by processor 10 along the SIGSIZE line at the SIGSIZE input port to processor 10. A measurement by processor 10 may be taken near the end of a scan, or at intervals during the scan, as directed by processor programming. Once SIGSIZE is measured, C7 may be reset by the processor 10 for the next reading, and SIGSIZE may be re-measured at some point later. Table I shows suggested components for the signal size detector 11.

In the alternative, the signal size detector 16 may receive an input from VIN, the output of the differentiating circuit 4, and processor 10 programmed to respond according to the signal size of VIN measured along SIGSIZE by the processor 10.

Figure 9:
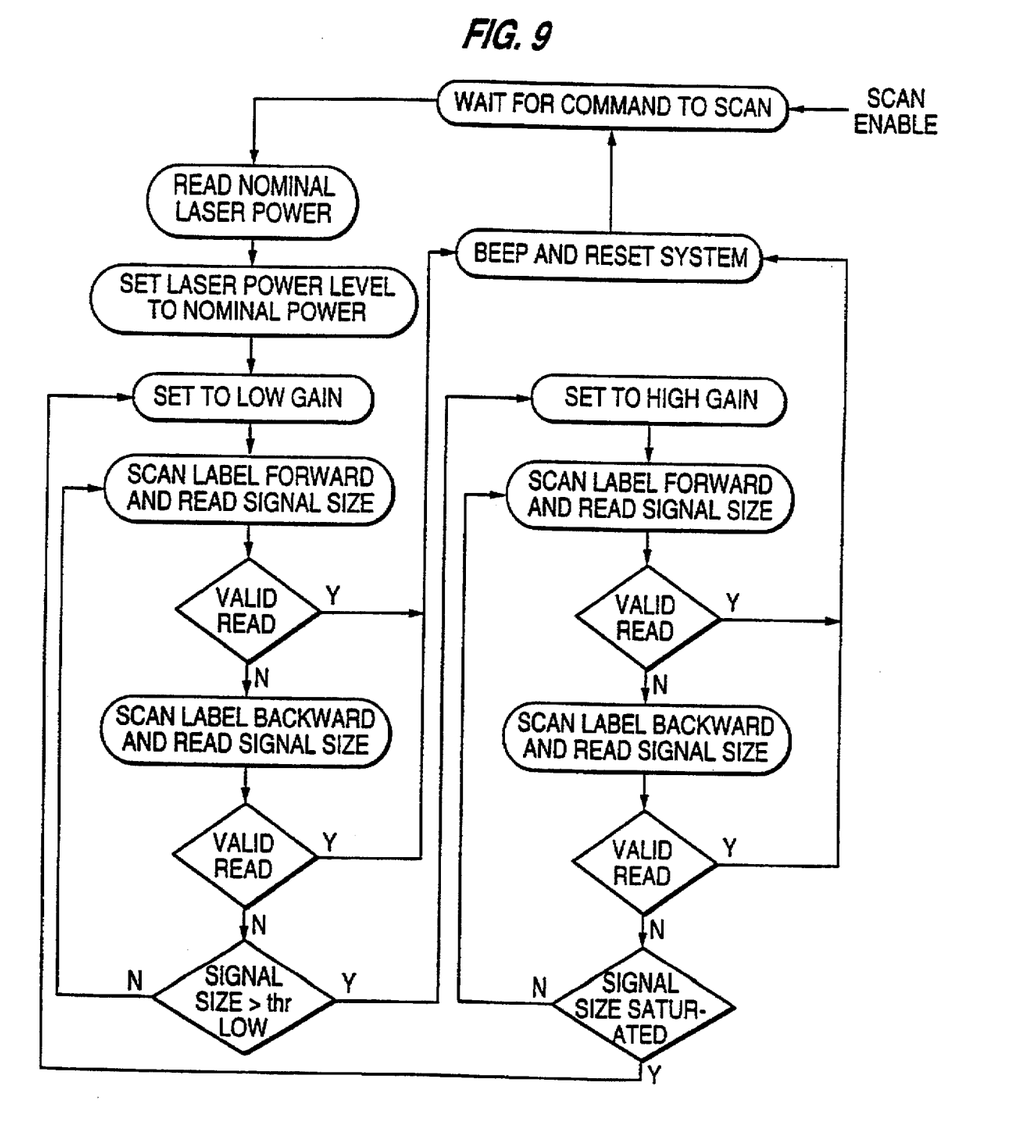
FIG. 9 is a flow chart of the scanning program in the second embodiment of the invention.

In the second embodiment, calibration of the nominal laser power for the system occurs according to FIG. 6 as discussed earlier. FIG. 9 is a flowchart illustrating the scanning steps under the second embodiment, utilizing the signal size detector 16. There are two signal size control points, low threshold and saturation threshold, which are stored in memory 9 and read by processor 10. The threshold low point represents a signal size below which the digitizer 6 cannot accurately generate the analog BARCODE signal. The saturation threshold point represents a signal size at which the input to the digitizer circuit 6 saturates and the circuit 6 can no longer operate. These two control points are determined empirically based on the specific digitizer so as to maintain accurate digitizing of the Vout signal.

In FIG. 9, processor 10 waits for a command to scan from scan enable 8. Once received, the nominal laser power level is read from memory 9 by processor 10, and the processor 10 sets the laser through the laser diode circuit 1 to the nominal power level. Next, processor 10 sets amplifier 5 to low gain, and the label containing the symbol is scanned forward and backward. During the scan, the signal size is measured by processor 10 at such time(s) during a scan as directed by programming. FIG. 9 shows two signal size measurements; however, higher multiples of measurements or only one measurement may be taken. When more than one measurement of signal size is taken by processor 10, the processor 10 is programmed to store them in its built-in RAM memory and statistically manipulate the values to obtain a representative signal size. For example, the values may be averaged. At anytime during the scan, if a valid symbol is read, the system beeps to indicate that a valid read has occurred, resets to end scanning, and waits for the next command to scan from scan enable 8. If no valid read occurs, the processor 10 compares the representative measured signal size with the low threshold control point that was stored in memory 9. If the signal size is above the low threshold, then scanning continues at the low gain level. However, if the signal size is below the low threshold, then amplifier 5 is set to high gain by processor 10, and the label is again scanned and signal size reading(s) taken. If a not valid read occurs during the scan, the processor 10 compares the representative signal size measured with the saturation threshold control point stored in memory 9. If the signal size measured is below the saturation level, then scanning continues at high gain. However, if the measured signal size is above the saturation level, then processor 10 sets amplifier 5 back to low gain before the next scan. Processor 10 will continue scanning while switching gain levels between scans in response to measured signal size as described above, until a valid read occurs or scan enable indicates to the processor 10 to end scanning.

Table I below provides, by way of example, the components and component values for a presently preferred embodiment of the circuits illustrated in FIG. 2, 3, 5, and 8.

TABLE I

| | | |
|---|---|---|
| U1A | Operational Amplifier Texas Instruments TLC272 | |
| U1B | Operational Amplifier Texas Instruments TLC274 | |
| Q1 | PNP Transistor 2N 3906 | |
| Q2 | NPN Transistor 2N 3904 | |
| Q3 | NPN Transistor 2N 4401 | |
| X1 | Laser Drode | Toshiba TOLD 99221M |
| C1 | Capacitor | 0.1 µf (microfarads) ± 20% |
| C2 | Capacitor | 220 pf( picofarads) |
| C3 | Capacitor | 0.022 µf |
| C4 | Capacitor | 100 pf |
| C5 | Capacitor | .22 pf |
| C6 | Capacitor | 0.1 µf |
| C7 | Capacitor | 0.1 µf |
| D1 | PN Diode | BAV99 |
| D2 | PN Diode | BAV99 |
| R1 | Resistor | 1.5k (kilo-ohms) |
| R2 | Resistor | 20 ohms |
| R3 | Resistor | 6.8 k |
| R4 | Resistor | 15.0 k |
| R5 | Resistor | 47 k |
| R6 | Resistor | 47 k |
| R7 | Resistor | 12 k |
| R8 | Resistor | 47 k |
| R9 | Resistor | 6.8 k |
| R10 | Resistor | 47 k |
| R11 | Resistor | 1 M (meg-ohms) |
| R12 | Resistor | 330 k |
| R13 | Resistor | 27 k |
| R14 | Resistor | 150 k |
| R15 | Resistor | 1 k |

From the foregoing description, it will be apparent that there has been provided an improved system for bar code reading and scanning with automatic gain control. Variations and modifications in the herein described system in accordance with the invention will undoubtedly suggest themselves to those skilled in the art. Accordingly, the foregoing description should be taken as illustrative and not in a limiting sense.

I claim:

1. A method for calibration of an optical output power of a laser diode in a bar code scanner to determine a nominal power which is operable within a range defined between a minimum range and a maximum range with respect to the bar code scanner, the method comprising the steps of:

a) placing a test bar code symbol at the maximum range;

b) setting a receive amplification gain level to a first gain level which corresponds to a maximum allowable receive gain, the receive amplification gain level being used to amplify a return signal that corresponds to light reflected off of a bar code symbol due to light from the laser diode being incident on the bar code symbol;

c) setting the optical output power of the laser diode to a first power which corresponds to about one-half a maximum allowable optical output power of the laser diode;

d) scanning the test bar code symbol at the maximum range;

e) receiving a first return signal based on the scanning of the test bar code symbol at the maximum range;

f) demodulating and decoding the first return signal to obtain a first decoded bar code symbol as a result thereof;

g) comparing the first decoded bar code symbol obtained at the step f) with a stored version of the test bar code symbol to determine if the test bar code symbol at the maximum range was correctly read;

h) if the test bar code symbol at the maximum range was correctly read in the step g), then decrementing the optical output power of the laser diode by a fixed amount and returning to the step d);

i) if the test bar code symbol at the maximum range was not correctly read in the step g), then incrementing the optical output power of the laser diode by the fixed amount, wherein if the incremented optical output power of the laser diode is greater than the maximum allowable optical output power of the laser diode, the bar code scanner is determined to be faulty and the process ends;

j) scanning the test bar code symbol at the maximum range;

k) receiving a second return signal based on the scanning of the test bar code symbol at the maximum range performed during the step j);

l) demodulating and decoding the second return signal to obtain a second decoded bar code symbol as a result thereof;

m) comparing the second decoded bar code symbol obtained at the step l) with the stored version of the test bar code symbol to determine if the test bar code symbol at the maximum range was correctly read;

n) if the test bar code symbol at the maximum range was not correctly read in the step m), then incrementing the optical output power of the laser diode by the fixed amount and returning to the step j);

o) if the test bar code symbol at the maximum range was correctly read in the step m), then setting the receive amplification gain level to a second gain level which corresponds to a minimum allowable receive gain;

p) placing the test bar code symbol at the minimum range;

q) scanning the test bar code symbol at the minimum range;

r) receiving a third return signal based on the scanning of the test bar code symbol at the minimum range;

s) demodulating and decoding the third return signal to obtain a third decoded bar code symbol as a result thereof;

t) comparing the third decoded bar code symbol obtained at the step s) with the stored version of the test bar code symbol to determine if the test bar code symbol at the minimum range was correctly read;

u) if the test bar code symbol at the minimum range was correctly read in the step t), then setting the nominal power of the laser diode to the optical output power of the laser diode that was used in the steps o) through t); and v) if the test bar code symbol at the minimum range was not correctly read in the step t), then determining that the bar code scanner is faulty and not available for use in scanning bar codes.

2. The method according to claim 1, further comprising the step of:

w) if the test bar code symbol was correctly read in the step t), then storing the nominal power of the laser diode to a memory provided within the bar code scanner.

3. The method according to claim 1, further comprising the step of:

w) repeating the steps a) through v) for a second test bar code symbol, wherein the bar code scanner is determined as being available for use only if both the first and second test bar code symbols were correctly read at both the minimum and maximum ranges.

4. The method according to claim 2, wherein, for every scan of the bar code scanner, the nominal power of the laser diode is retrieved from the memory in order to set the nominal power as the optical output power of the bar code scanner.

5. A method for calibration of an optical output power of a laser diode in a bar code scanner to determine a nominal power which is operable within a range defined between a minimum range and a maximum range with respect to the bar code scanner, the method comprising the steps of:

a) placing a test bar code symbol at the maximum range;

b) setting a receive amplification gain level to a first gain level which corresponds to a maximum allowable receive gain, the receive amplification gain level being used to amplify a return signal that corresponds to light reflected off of a bar code symbol due to light from the laser diode being incident on the bar code symbol;

c) setting the optical output power of the laser diode to a first power which corresponds to the maximum allowable optical output power of the laser diode;

d) scanning the test bar code symbol at the maximum range;

e) receiving a first return signal based on the scanning of the test bar code symbol at the maximum range;

f) demodulating and decoding the first return signal to obtain a first decoded bar code symbol as a result thereof;

g) comparing the first decoded bar code symbol obtained at the step f) with a stored version of the test bar code symbol to determine if the test bar code symbol at the maximum range was correctly read;

h) if the test bar code symbol at the maximum range was correctly read in the step g), then decrementing the optical output power of the laser diode by a fixed amount and returning to the step d);

i) if the test bar code symbol at the maximum range was not correctly read in the step g), then incrementing the optical output power of the laser diode by the fixed amount, wherein if the incremented optical output power of the laser diode is greater than the maximum allowable optical output power of the laser diode, the bar code scanner is determined to be faulty and the process ends;

j) Setting the receive amplification gain level to a second gain level which corresponds to a minimum allowable receive gain;

k) placing the test bar code symbol at the minimum range;

l) scanning the test bar code symbol at the minimum range;

m) receiving a second return signal based on the scanning of the test bar code symbol at the minimum range;

n) demodulating and decoding the second return signal to obtain a second decoded bar code symbol as a result thereof;

o) comparing the second decoded bar code symbol obtained at the step n) with the stored version of the test bar code symbol to determine if the test bar code symbol at the minimum range was correctly read;

p) if the test bar code symbol at the minimum range was correctly read in the step o), then setting the nominal power of the laser diode to the optical output power of the laser diode that was incremented at the step i); and q) if the test bar code symbol at the minimum range was not correctly read in the step o), then determining that the bar code scanner is faulty and not available for use in scanning bar codes.

6. The method according to claim 5, further comprising the step of:

r) if the test bar code symbol was correctly read in the step o), then storing the nominal power of the laser diode to a memory provided within the bar code scanner.

7. The method according to claim 5, further comprising the step of:

r) repeating the steps a) through q) for a second test bar code symbol, Wherein the bar code scanner is determined as being available for use only if both the first and second test bar code symbols were correctly read at both the minimum and maximum ranges.

8. The method according to claim 6, wherein, for every scan of the bar code scanner, the nominal power of the laser diode is retrieved from the memory in order to set the nominal power as the optical output power of the bar code scanner.

9. A method for calibration of an optical output power of a laser diode in a bar code scanner to determine a nominal power which is operable within a range defined between a minimum range and a maximum range with respect to the bar code scanner, the method comprising the steps of:

a) placing a test bar code symbol at the maximum range;

b) setting a receive amplification gain level of the bar code scanner to a first gain level;

c) setting the optical output power of the laser diode to a first power;

d) scanning the test bar code symbol at the maximum range;

e) determining if the scanned test bar code symbol at the maximum range is correctly read;

f) if the test bar code symbol at the maximum range was correctly read in the step e), then decrementing the optical output power of the laser diode by a fixed amount and returning to the step d);

g) if the test bar code symbol at the maximum range was not correctly read in the step e), then incrementing the optical output power of the laser diode by the fixed amount, wherein if the incremented optical output power of the laser diode is greater than a maximum allowable optical output power of the laser diode, the bar code scanner is determined to be faulty and the process ends;

h) setting the receive amplification gain level to a second gain level which is less than the first gain level;

i) placing the test bar code symbol at the minimum range;

j) scanning the test bar code symbol at the minimum range;

k) determining if the scanned test bar code symbol at the minimum range is correctly read;

l) if the test bar code symbol at the minimum range was correctly read in the step k), then setting the nominal power of the laser diode to the optical output power of the laser diode that was incremented at the step g); and m) if the test bar code symbol at the minimum range was not correctly read in the step k), then determining that the bar code scanner is faulty and not available for use in scanning bar codes.

10. The method according to claim 9, further comprising the step of:

n) if the test bar code symbol was correctly read in the step k), then storing the nominal power of the laser diode to a memory provided within the bar code scanner.

11. The method according to claim 9, further comprising the step of:

r) repeating the steps a) through m) for a second test bar code symbol, wherein the bar code scanner is determined as being available for use only if both the first and second test bar code symbols were correctly read at both the minimum and maximum ranges.

12. The method according to claim 10, wherein, for every scan of the bar code scanner, the nominal power of the laser diode is retrieved from the memory in order to set the nominal power as the optical output power of the bar code scanner.

13. The method according to claim 9, wherein the scanned test bar code symbol at the minimum range and the maximum range is determined to be correctly read by respectively comparing a decoded version of the scanned test bar code symbol at the minimum range and the maximum range with a stored version of the test bar code symbol within the bar code scanner.

* * * * *